US007467400B1

(12) United States Patent
Moss et al.

(10) Patent No.: US 7,467,400 B1
(45) Date of Patent: Dec. 16, 2008

(54) INTEGRATED SECURITY SYSTEM HAVING NETWORK ENABLED ACCESS CONTROL AND INTERFACE DEVICES

(75) Inventors: John L. Moss, Wayland, MA (US); Barry Gaiman, Belmont, MA (US)

(73) Assignee: S2 Security Corporation, Framingham, MA (US)

( * ) Notice: Subject to any disclaimer, the term of this patent is extended or adjusted under 35 U.S.C. 154(b) by 975 days.

(21) Appl. No.: 10/779,928

(22) Filed: Feb. 17, 2004

Related U.S. Application Data

(60) Provisional application No. 60/447,544, filed on Feb. 14, 2003.

(51) Int. Cl.

| | |
|---|---|
| ***G06F 17/30*** | (2006.01) |
| ***G06F 15/18*** | (2006.01) |
| ***H04L 9/00*** | (2006.01) |

(52) U.S. Cl. ................................ 726/3; 726/22; 726/23; 713/150

(58) Field of Classification Search ...................... 726/3
See application file for complete search history.

(56) References Cited

U.S. PATENT DOCUMENTS

| | | | |
|---|---|---|---|
| 4,839,640 | A | 6/1989 | Ozer et al. |
| 5,210,873 | A | 5/1993 | Gay et al. |
| 6,119,125 | A | 9/2000 | Gloudeman et al. |
| 6,157,943 | A | 12/2000 | Meyer |
| 6,233,588 | B1 | 5/2001 | Marchoili et al. |
| 6,271,752 | B1 | 8/2001 | Vaios |
| 6,374,356 | B1 | 4/2002 | Daigneault et al. |
| 6,422,463 | B1 | 7/2002 | Flink |

(Continued)

FOREIGN PATENT DOCUMENTS

WO WO 2004055608 A2 * 7/2004

OTHER PUBLICATIONS

Vutukuru et al, Efficient and Robust TCP Stream Normalization, 2008, IEEE, pp. 96-110.*

(Continued)

*Primary Examiner*—Ayaz R Sheikh
*Assistant Examiner*—Aravind K Moorthy
(74) *Attorney, Agent, or Firm*—Chapin IP Law, LLC; Barry Gaiman, Esq.

(57) ABSTRACT

An integrated security system operating over a network includes a network security controller coupled to the network having a relational database including portal objects and related resources represented in at least one table in the relational database. The system further includes at least one network node having a local database coupled to the network adapted to receive predetermined resource information from the relational database, an event generator coupled to the local database to provide at least one portal event in response to the predetermined resource information received by the local database, and a finite state portal controller coupled to the network and the event generator for providing at least one of an action and a global event in response to the at least one portal event.

9 Claims, 8 Drawing Sheets

U.S. PATENT DOCUMENTS

| | | | | |
|---|---|---|---|---|
| 6,504,479 | B1 | 1/2003 | Lemons et al. | |
| 6,643,779 | B1 | 11/2003 | Leung et al. | |
| 6,990,660 | B2 * | 1/2006 | Moshir et al. | 717/171 |
| 2001/0034754 | A1 * | 10/2001 | Elwahab et al. | 709/201 |
| 2003/0080865 | A1 | 5/2003 | Capowski et al. | |
| 2003/0210139 | A1 * | 11/2003 | Brooks et al. | 340/531 |
| 2007/0180107 | A1 * | 8/2007 | Newton et al. | 709/224 |
| 2007/0204338 | A1 * | 8/2007 | Aiello et al. | 726/11 |
| 2007/0214504 | A1 * | 9/2007 | Milani Comparetti | 726/23 |

OTHER PUBLICATIONS

Wang et al, Shield: Vulnerability-Driven Network Filters for Preventing Known Vulnerability Exploits, 2004, ACM, pp. 193-204.*

Watson et al, Protocol Scrubbing: Network Security Through Transparent Flow Modification, 2001, ACM, pp. 261-273.*

Rubin et al, Protomatching Network Traffic for High Throughput Network Intrusion Detection, 2006, ACM, pp. 47-58.*

* cited by examiner

INTEGRATED SECURITY SYSTEM HAVING NETWORK ENABLED ACCESS CONTROL AND INTERFACE DEVICES

CROSS-REFERENCE TO RELATED APPLICATIONS

This application claims the benefit of U.S. Provisional Application No. 60/447,544, filed on Feb. 14, 2003 which application is hereby incorporated herein by reference in its entirety.

STATEMENTS REGARDING FEDERALLY SPONSORED RESEARCH

Not applicable.

FIELD OF THE INVENTION

This invention relates generally to security systems and more particularly to security systems including network enabled access control, video and audio devices which communicate over a common local area network.

BACKGROUND OF THE INVENTION

In security applications, separate systems are often needed to provide access control, burglar alarm, and audio and video capabilities at access points in an individual office or a facility including one or more buildings. The installation, the addition of new features and the operation of conventional systems is often complicated by the use of various incompatible communications channels required by the individual systems. Another problem, relating to the addition of new features, is the interoperability of installed legacy systems where hardware replacement is not economically feasible.

Managing the configuration of hardware devices at the lowest levels of the system, for example card readers door switches and motion sensing devices is complicated by the requirement for continued operation during software upgrades and the need to operate with various hardware devices including legacy reader modules, input modules, output modules, and panels (i.e., intelligent devices which control a collection of modules).

FIG. 1 depicts a conventional security system 10 including an access control system 12 having monitoring station 14 coupled via a plurality of dedicated RS-485 lines to a corresponding plurality of security panels 16*a*-16*n* (generally referred to as panels 16 and also referred to as field devices). The monitoring station 14 is typically a dedicated personal computer running a software application specifically tailored to the system 10. Each panel 16 is coupled to a plurality of modules 18*a*-18*n* (also referred to as field devices) via dedicated RS-485 lines. The correspondence between a physical location and each module 18 is determined by a physical wiring connection at installation time. Each module 18 is coupled to a plurality of door controls 20*a*-20*n* via a plurality of dedicated serial communication (e.g. RS-232, RS-422, RS-485) lines. The system 10 further includes a separate video system 30. The video monitoring system typically includes a video display 34, a video mixer 36 (also referred to a video multiplexer 36) and a plurality of video cameras 38. The cameras 38, multiplexer 36 and display 34 are generally coupled via coaxial cable (coax) which is more expensive than the dedicated RS-485 lines used in the access control system 12. The cameras 38*a*-38*n* are typically controlled by the video display 34 over control lines 35*a*-35*n* to provide pan, tilt and zoom (PTZ) functions. An optional video tape recorder (VCR) (not shown) or digital video recorder (DVR) (not shown) is connected to the mixer 36 to provide a temporary storage of images captured by the cameras 38. In conventional systems, access control wiring connecting the modules 18 is generally wired back to a central closet where the panels 16 are located.

The monitoring station 14 includes a dedicated software application that communicates with each panel 16*a*-16*n*. The addition of new user interfaces and remote interaction with the security monitoring application is difficult with the configuration of FIG. 1 because typically a single application operates on the dedicated monitoring station 14. Expanding the number of door controls 20, field devices 18 and panels 16 is difficult because of the RS-485 communication protocols and transmission speeds. It is further difficult for the panels 18 to interoperate with devices using newer technology or operating with different communications protocols.

Access systems for larger facilities often supervise numerous access points. In order to effectively supervise door controls coupled to field devices a relatively large number of panels 16 are required. These panels 16 provide a relatively small data bandwidth channel from the monitoring station 14 to devices proximate to the access points. Because of the low data rate, it is not feasible to transmit audio or video data to or through the panels 16, and therefore it is difficult to integrate video and audio with other data at the access points. It is also difficult to effectively remotely monitor and diagnose device problems and failures at an access point.

The installation of access control, video, and audio devices in conventional systems is complicated by the panel topology and the use of a combination of video cable, and cable wiring which is used to identify a specific device. Other problems associated with point to point wiring include connecting multiple conductors, labeling each of these conductors, and associating each device with a physical location.

Some conventional systems, such as that described in U.S. Pat. No. 6,504,479 attempt to integrate an image based video security system, a burglar alarm system and an access control system to detect the presence of an intrusion onto a site. However, the control, sensor, video, audio, and bi-directional components in these systems do not operate over a common communications channel and are typically integrated through interfaces from each of the separate applications top level management software, rather than through direct interaction between the lower-level components. Control of these systems is directed from a central monitoring center.

It would, therefore, be desirable to provide a security system including distributed control, monitoring, audio and video devices operating over a common communications channel which facilitates the interoperability of the security system with installed legacy panels and associated modules on the common communications channel. It would be further desirable to reduce the number of installation tasks and simplify the security system installation.

SUMMARY OF THE INVENTION

In accordance with the present invention, an integrated security system operating over a network includes a network security controller coupled to the network having a relational database including portal objects and related resources represented in at least one table in the relational database. The system further includes at least one network node having a local database coupled to the network adapted to receive predetermined resource information from the relational database, an event generator coupled to the local database to provide at least one portal event in response to the predetermined resource information received by the local database, and a finite state portal controller coupled to the network and the event generator for providing at least one of an action and a global event in response to the at least one portal event. With such an arrangement, the interoperability of a security system with installed legacy panels and associated modules on a common communications channel is facilitated by handling access control events from a range of devices in a network node. This arrangement reduces the number of installation tasks and simplifies the security system installation.

In accordance with a further aspect of the invention a method to normalize an access control event includes converting a field device signal representing the access control event to a data stream, normalizing the data stream to provide a portal event, and processing the portal event in a finite state portal controller to provide local actions and global events. With such a technique, legacy security panels including non-networked enabled devices can interoperate with the integrated security system on a common communications channel.

In one embodiment, an extensible markup language, XML, is used to represent predetermined resource information and global events transmitted between the network security controller and the network nodes. In another embodiment, a security system administrative user can access the security system using a standard web browser that operates on a variety of computer platforms. This provides a zero footprint programming model whereby no installed components of software are required on an administrative user's PC. The use of the standard web browser reduces software maintenance, training, support and installation costs since special software is not required for the administrator's computer.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
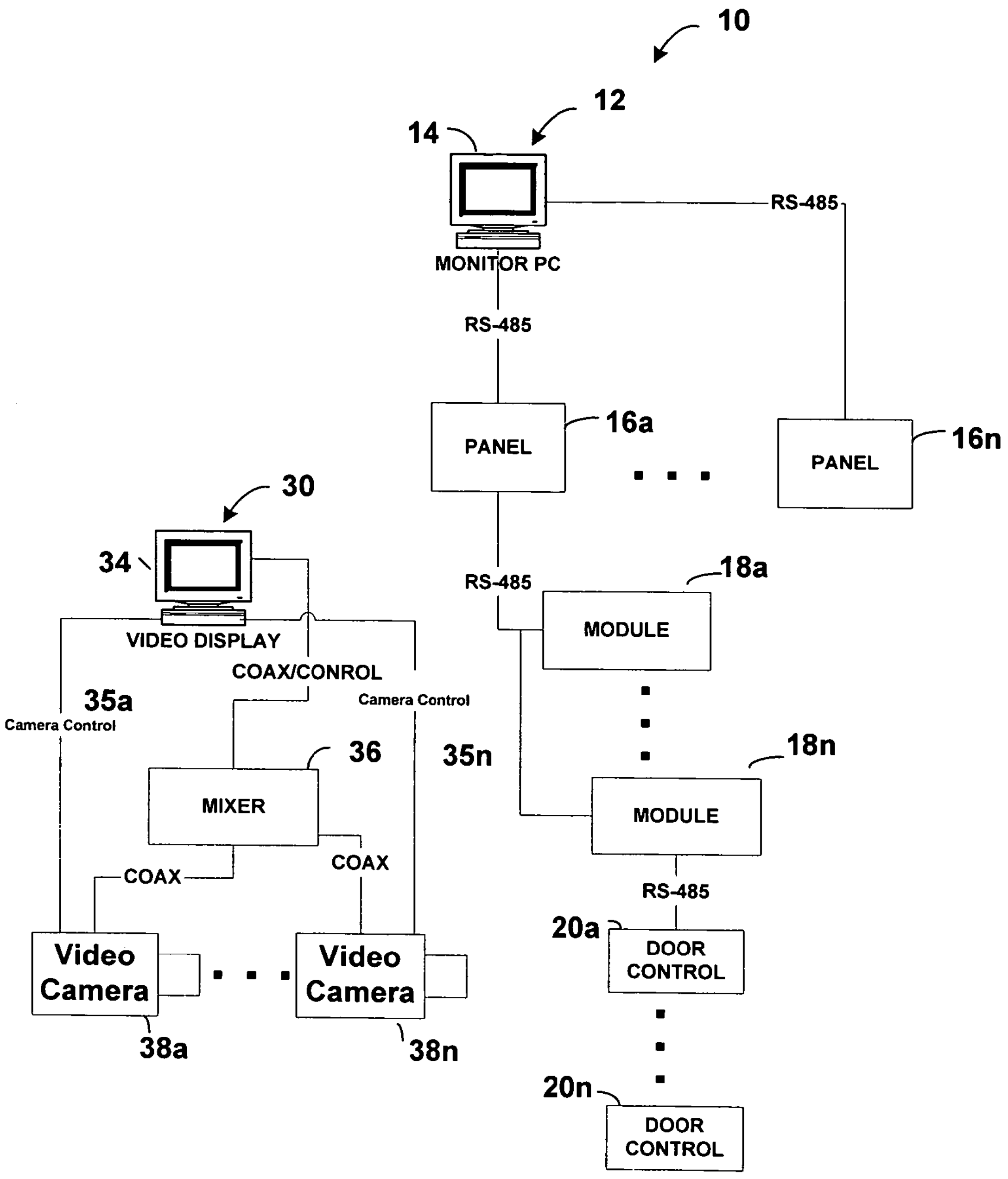
FIG. 1(PRIOR ART)
FIG. 1 is a block diagram of a prior art access control system.

Before providing a detailed description of the invention, it may be helpful to define some of the terms used in the description. The term "network enabled" as used herein refers to a device (also referred to as a module) or system which communicates over network media using an open system transport and data protocol, for example the TCP/IP protocol over a variety of physical media, including but not limited to CSMA/CD (Carrier Sense Multiple Access LANs with Collision Detection) Ethernet IEEE 802.3, Wi-FI Wireless LAN IEEE 802.11, Wireless Personal Area Network IEEE 802.15, Broadband Wireless Access IEEE 802.16, Broadband, HomePlug® and HomePNA™ networks.

As used herein, the term "portal" also referred to as "access portal" refers to a physical opening or area under access control and/or supervision. A security system permits or denies physical access between the low security (e.g., outside an office) and high security side of the portal. The term "access point" as used herein refers to a location where identification information is acquired and where physical access is controlled (e.g. allowed or prevented). An access point may be associated with card readers, other identification (ID) devices, keypads, and access portals having relays and alarm inputs.

As used herein, a "door switch monitor" (DSM) refers to an input signal to the access point that indicates the secured/unsecured (i.e., closed/open) status of an associated access portal. The term "request-to-exit" (REX) refers to an input signal at an access point that indicates that a person on the secure side of an access portal has been detected. The REX allows the person to exit, and the person can pass through the access portal from the secure side to the unsecured side without causing an alarm.

As used herein, a "finite state machine" (FSM) refers to a process including a set of states, a start state, a set of events, and a transition function that maps events and current states to a next state. A "finite state portal controller" is an FSM arranged to receive portal events and to provide actions and global events in response to the portal events. The actions are referred to as local actions when the actions affect only devices controlled by the finite state portal controller. As used herein, a "portal event" is an event associated with a portal. A first example is a REX activation signal at a portal. A second example is a "Valid Card Read" signal resulting from a validated card read with corresponding card data at an access point associated with a portal. A "global event," as used herein, is an event that is associated with a portal having a global identifier (i.e., a unique identifier associated with the portal or alarm point) and includes, for example, activity logging data from a portal.

As used herein, an "action" also referred to as a "local action" refers to the operation of a component of the security system, for example, unlocking a door lock, setting or resetting a relay, sounding an audible alarm, commanding a camera to move and capture images, and sending an e-mail, text or voice message to a user.

Figure 2:
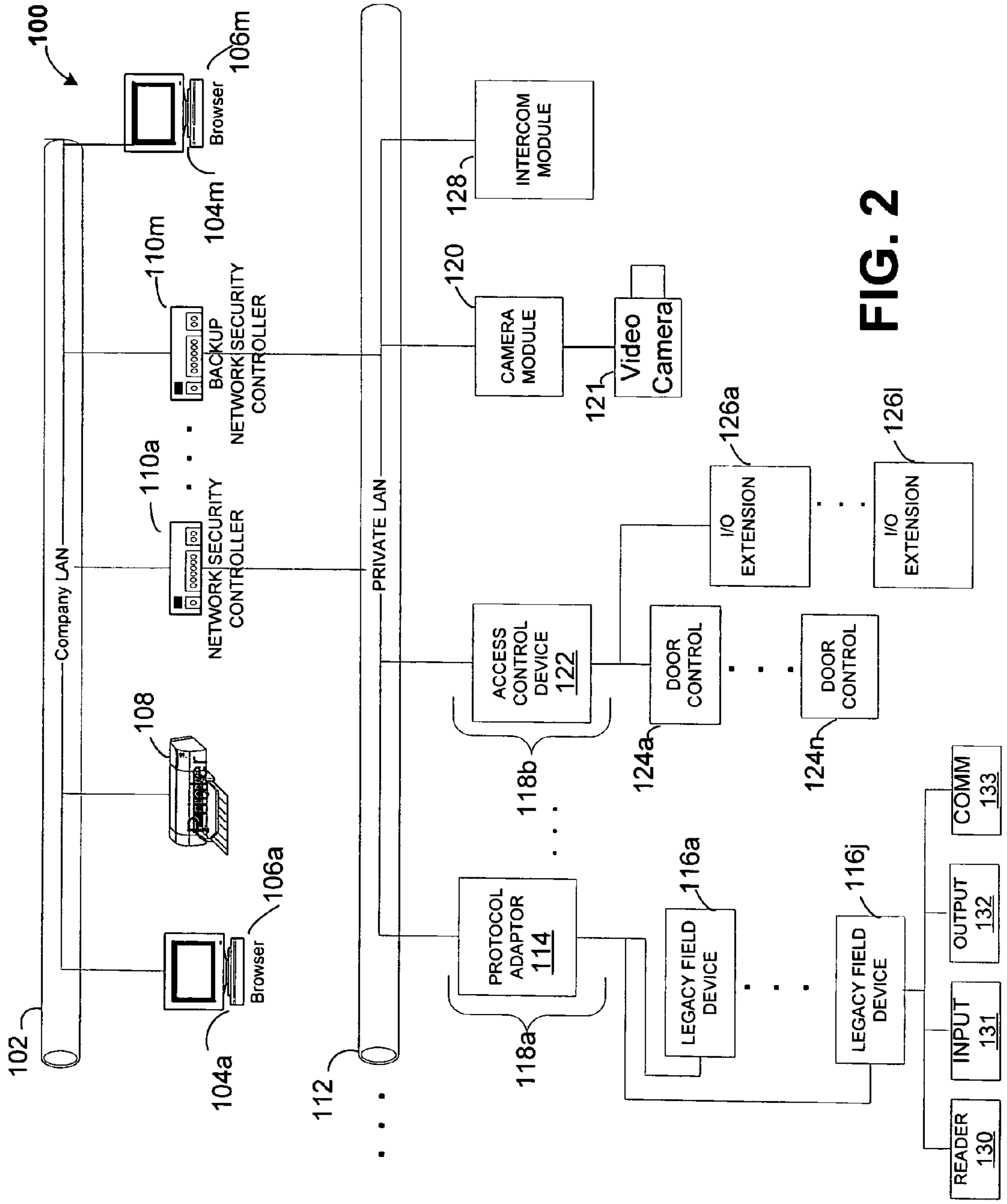
FIG. 2 is a schematic block diagram of an integrated security system including network security controllers and network enabled access control, protocol adaptor and interface devices according to the invention.

Now referring to FIG. 2, an exemplary network enabled integrated security system 100 includes a plurality of user PCs **104*a*-104*m* running a plurality of commercially available browsers 106*a*-106*m* (generally referred to as browser 106 or web browser 106), and network printer 108, each coupled to a company local area network (LAN) 102. The system 100 further includes one or more network security controllers 110*a*-110*m* (generally referred to as network security controller 110 and also referred to as network security panel) coupled to the company LAN 102 and a portion of a private LAN 112 (shown at one access point for clarity). It will be appreciated by those of ordinary skill in the art that the company LAN 102 and a portion of the private LAN 112** could be provided by a single physical network, a single network including one or more virtual LANs (VLANs), or network segments coupled by routers, bridges and switches.

An optional protocol adaptor 114 and access control device 122 are coupled to a portion of the private LAN 112 and are also referred to as network nodes 118*a*, 118*b*, and 118*p* and network enabled devices 118, respectively and collectively referred to as network nodes 118. The common components of the network node 118 are described below in conjunction with FIG. 4. The optional protocol adaptor 114 is coupled to a plurality of legacy field devices 116*a*-116*j* (generally referred to as legacy field device 116), and is coupled to the portion of the private LAN 112. A legacy field device 116 includes but is not limited to a control panel, a reader module, input module, output module, communications modules and biometric devices. Here for example, legacy field device 116*j* is a panel 116*j* (also referred to as a security panel, or a sub-panel) similar to the panel 16*a* (FIG. 1). The panel 116*j* is coupled to a reader module 130, an input module 131, an output module, and a communications module 133 (collectively referred to as modules 130-133). Legacy field devices 116 generally use a protocol which is incompatible with the private LAN 112.

The network enabled access control device 122 is coupled to a plurality of door controls 124*a*-124*n* (generally referred to a door control 124) and a plurality of input output (I/O) extensions 126*a*-1261 (generally referred to a I/O extension 126). The access control device 122 generally controls several door controls 124 and I/O extensions 126 which provide resources to several portals. The door control 124 (also referred to as access extension 124) generally includes two reader interfaces (not shown), at least one lock relay (not shown) that operates a door strike (not shown) and other devices (e.g. an LED or an indicator lamp), a DSM input (not shown) and a REX input (not shown). It is understood, that a various configurations of readers, supervised inputs (inputs monitored by the access control device 122), DSM and REX inputs, and control relays can be provided at the access extension 124 as resources related to a portal. The access control device 122 may use biometric identification and may include a pair of readers (not shown) on each side of the access portal. The I/O extension 126, which is similar to access extension 124, includes different combinations of input ports and output ports and generally does not include reader interfaces.

A network enabled video camera module 120 (also referred to as a IP camera module 120 or an network enabled interface) coupled to at least one camera 121, is coupled to the portion of the private LAN 112. A network enabled intercom module 128 (also referred to as an intercom 128 or a network enabled interface) is coupled to the portion of the private LAN 112.

The private LAN 112 is a packet network and the physical implementation includes but is not limited to Ethernet type wiring (e.g., 10/100/1000 BaseT), HomePlug® or HomePNA™ network (i.e. communication over power lines or phone wiring), fiber, and wireless communication. It will be appreciated by those of ordinary skill in the art that the company LAN 102 and the private LAN 112 can each optionally include additional segments interconnected by routers, bridges, firewalls and other communications devices and each LAN 102, 112 can be connected to the Internet and that the company LAN 102 can include the private LAN 112, and the system 100 can operated over a single LAN.

In operation, the network security controller 110 provides a web server accessible to one or more administrative users using the browsers 106*a*-106*m*. It is understood that multiple users can access the web server from the multiple browsers 106*a*-106*m*, and that security can be provided by various means including but not limited to biometric identification, secure socket layer (SSL), virtual LANs, virtual private networks (VPN) and secure web server protocols HTTPS. The basic functions of access control at each portal are provided by the resources coupled to the access control device 122 in conjunction with one or more network security controllers 110. In one embodiment, in an access scenario, a person seeking access presents a credential including but not limited to a proximity card (PROX), a magnetic-stripe card, a smart card (with biometric identification data or digital certificates) and a Wiegand ID card, at the card reader coupled to a reader interface on an access extension 124 coupled to the access control device 122. The reader transmits the person's card ID number to the access extension 124. The access extension 124 transmits the card ID number to the access control device 122. The access control device 122 then compares the card ID number valid card numbers in a local database to see if that person associated with the card ID number has permission to pass through the portal at the current time. If the person has permission to enter, the access control device 122 provides a portal event "Valid Card Read," a local action actuates the door control 124 to unlock the door, and a global event Valid Access including the global identifier for the portal and the card data is for the portal and the card data is sent to the network security controller 110. In this embodiment, the network security controller 110 will act as a master database and keeps the local databases on the access control devices 122 up to date and synchronized. Additionally, the access control device 122 can query the database on the network security controller 110 before rejecting the person's access card. In an alternative embodiment, the card database will be stored in a database on the network security controller 110, which makes the decision to allow access and sends the decision back to the access control device 122.

The access extension 124 and the I/O extension 126 support supervised inputs, contact closures, and contacts having end of line termination in order to report state changes of inputs. The access extension 124 and the I/O extension 126 support outputs (e.g., relays) and receive commands to change the output state. For example, a DSM (door monitor) senses the open/secured state of the door and the REX (request-to-exit) point is used to signal that the door will be opened from the secure side without a card read. The access extension 124 and the I/O extension 126 support programmable logic control (PLC) controls locally, so that outputs may be configured to follow inputs under certain circumstances, and relays can have locally timed activations. The access point can, itself, include supervised inputs and outputs. The access extension 124 and the I/O extension 126 in conjunction with the access control device 122 support input suppression so that not all state changes are processed to provide portal events. The access extension 124 further supports reader interfaces including but not limited to Wiegand readers, magnetic-stripe readers, pin pads, and smart cards. In one embodiment, the access control device 122 is coupled to a combination of access extension 124 and the I/O extension 126 which matches the resources of the portals to be controlled.

During installation, the network nodes 118 (i.e., the protocol adaptor 114 and the access control device 122), the camera module 120 and the intercom 128 (collectively referred to as network enabled devices) include electronic identification (e.g. a physical hardware interface address or MAC address determined by known address resolution protocol techniques). After installation, a physical location is associated with each identified network enabled device by various means including the use of a wireless browser, a PDA, and specially coded access cards. For example, the installer in the process of verifying the operation of system 100 can access a program on the web server that selects a predetermined location and directs the installer to operate a card reader associated with a predetermined door control 124. Alternatively the installer can select a location and proceed to identify the devices. Likewise the location of a camera 121 or intercom 128 can be determined by the use of the browser and actions of the installer (e.g. pressing the intercom 128 push to talk button or placing a pattern card in front of the camera 121). Installation time is further reduced because wiring from each network enabled devices is connected to nearby LAN 112 connections and not back to a central closet location.

The camera module 120 provides compressed video over the private LAN 112 therefore there is no requirement for analog mixing or multiplexing of video signal and no requirement for coaxial cable wiring. Multiple displays and camera sequencing are controlled in software in the network security controller 110. If required, the camera module supports pan, tilt and zoom (PTZ) operations by requests over the LAN from an operator (e.g. a security guard monitoring the facility), or automatically by software running in the network security controller 110 or the camera module 120 to track and follow activity. The intercom 128 provides a full duplex voice path using audio compression techniques and sending the resulting packetized data over the LAN using voice over IP (VoIP) or other methods known in the art.

In one embodiment, as described below in more detail in conjunction with FIG. 3, the network traffic to and from the network enabled devices and the network security controller 110 are monitored, such that the latency of the transmission of global events from the network nodes 118 to the network security controller 110 does not exceed a predetermined time interval. If necessary, the data transmission to and from the high data rate network enabled devices (e.g., the camera module 120 and the intercom 128) are throttled back to maintain the required minimum latency which affect the effective supervised update rate of the resources at each access point. To prevent loss of data in this case, high data rate devices have local buffering of data sources so that important information such as video data, is not lost even when the data transfer rate throttled back.

The network enabled devices can be coupled to the private LAN 112 using CAT5E or CAT6 wiring, a HomePlug® interface, or any other interface which supports a TCP/IP protocol. The network security controller 110 performs dynamic host configuration protocol (DHCP) functions when this service is not available on the company LAN 102.

Figure 3:
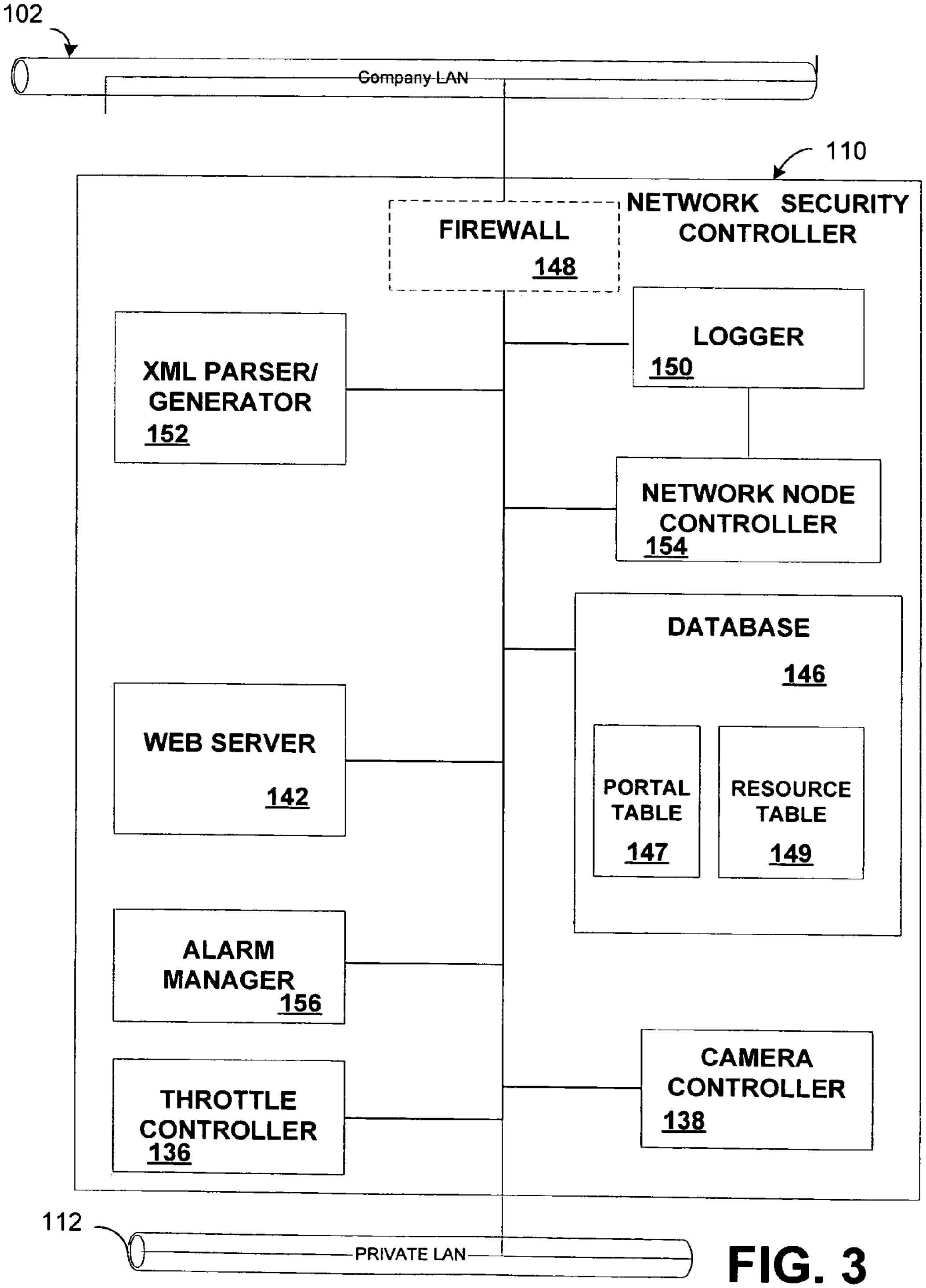
FIG. 3 is a block diagram of the network security controller of FIG. 2.

Now referring to FIG. 3 in which like reference numbers indicate like elements of FIG. 2, an exemplary network security controller 110 includes a firewall 148 coupled to the company LAN 102. A web server 142, a throttle controller 136, a database 1.46, a logger 150, an XML parser/generator 152, an network node controller 154 and an alarm manager 156, a camera controller 138, a throttle controller 136 and modem (not shown) are each coupled to the company LAN 102 through the firewall 148 and also coupled to the private LAN 112. It will be appreciated by those of ordinary skill in the art that not all of these components are required in each application. The blocks denoted "processor," "servers," "controller," "normalizer," "database," "logger," "engine," and "dialer" can represent computer software instructions or groups of instructions. Such processing maybe performed by a single processing apparatus which may, for example, be provided as part of network security controller 110. Alternatively, the blocks represent steps performed by functionally equivalent circuits such as a digital signal processor circuit or an application specific integrated circuit (ASIC).

The database 146, in one embodiment is a MySQL™ database and includes a portal table 147 and a resource table 149. The portal table 147 includes fields related to a portal object, for example, portal identification and portal resources (e.g., reader interfaces, inputs and outputs). In this embodiment, the web server is a 142 GoAhead® web server running both the hyper text transfer protocol (HTTP) and the secure hyper text transfer protocol (HTTPS) protocols.

In operation, the optional firewall 148 provides security by blocking unauthorized access to the private LAN 112. An optional SNMP processor (not shown) can be used to process and send SMMP messages for diagnostic purposes. The network security controller 110 provides administration and application support through an embedded web server 142 coupled to the web browsers **106*a*-106*m* on the company LAN 102 and the private LAN 112 and serves as a point of integration for the plurality of network enabled devices. In object oriented software terms, the network security controller 110 acts as a container object for a plurality of objects that, when properly coordinated, provide the core functionality of one or more security applications. The network security controller 110 operates either as networked device that can interact with other devices and computers on the company LAN 102, and in one embodiment is a microprocessor controlled embedded server. As a stand-alone device, the only external access is through a web browser 106 that interacts with the network security controller's internal web server 142. Data can be archived off of and reloaded on to the network security controller 110 using the network security controller's 110** internal file transport protocol (FTP) server or other secure means coupled to network attached storage (not shown).

The network security controller 110 handles several high level support and management functions. The web server 142 supports web access via HTTP and HTTPS protocols to provide an administrative user interface for access through the web browser 106 and supports FTP for making offline backups. The web server 142 also provides access to logged data, notification of alarms, ability to manage the system (e.g. add, delete or modify user access permissions) and so forth. The optional firewall 148 separates the company LAN from the private LAN 112 for the purposes of security and bandwidth isolation. The database 146 provides database functionality for portal objects and resources and other functions (e.g. ID card database for access control) and supplies predetermined resource information to network nodes 118. The database 146 updates and synchronizes the resource information in one or more network nodes 118 in conjunction with the network node controller 154.

The logger 150 maintains a log of global events associated with portals under control by network nodes 118 couple to the network security controller 110; The logger 150 keeps a history or data log of all activity at any of the network enabled devices controlled by the network security controller 110. This includes time stamped access requests, door alarms, and information from network nodes 118 and attached resources. This information can be viewed by the browsers **106*a*-106*m*** or downloaded to another system or network attached storage.

The alarm manager 156 supervises a the portals and associated resources and handles point associations across multiple access extensions 124 (door controls 124), I/O extensions 126 and legacy modules 130-133 to provide alarm monitoring and supervision. For example, an output on one I/O extension **126*a* can follow (i.e., turn off and on as a result of the state) an input on I/O extension 1261. The network node controller 154 serves as a point of configuration management for the plurality of network nodes 118. In one embodiment, the network node controller 154 provides diagnostics and heartbeats for monitoring the health of the communications paths between the network security controller 110 and the network nodes 118**.

The network security controller 110 also supports the integration of specific applications, including but not limited to: higher level access control functions like anti-passback, and handles known advanced access control regimes like the two-man rule and escorted access; elevator access control enabled floor buttons through relay closures; parking control, region counts by card type, parking "lot full", etc. indicators; and video.

The throttle controller 136 in conjunction with throttle controllers on the network enabled devices (e.g., the camera module 120), provides control of the network data stream from the camera module buffer such that the response of the door control supervision and the polling frequency of supervised inputs meets the operational requirements. The XML parser/generator 152 supports the representation of the predetermined resource information and global events in an extensible markup language. In one embodiment, the XML parser/generator 152 includes a Unicoi Systems Inc. Fusion Embedded XML DOM parser.

In one embodiment, the web server 142, the network node controller 154 and the alarm manager 156 are coupled by an interprocess communications mechanism, for example shared memory (not shown). The network node controller 154 and the web server 142 are coupled to the database 146 using an applications programming interface (API).

It will be appreciated by those of ordinary skill in the art that security for data transmissions on the company LAN 102 and the private LAN 112 can be provided by encryption and decryption techniques and the use of secure sockets SSL and IPSEC protocols as are known in the art. Encrypting the data, for example using 128-bit (or higher level) encryption, secures data exposed on the entire network (company LAN 102 or private LAN 112). Encryption of video, audio, access or I/O data at the module level provides protection from unauthorized intrusion or snooping. The network nodes 118 optionally include a self-diagnostic module to assure that everything is working properly within the network node 118 and if necessary reporting the status to the network security controller 110.

Figure 4:
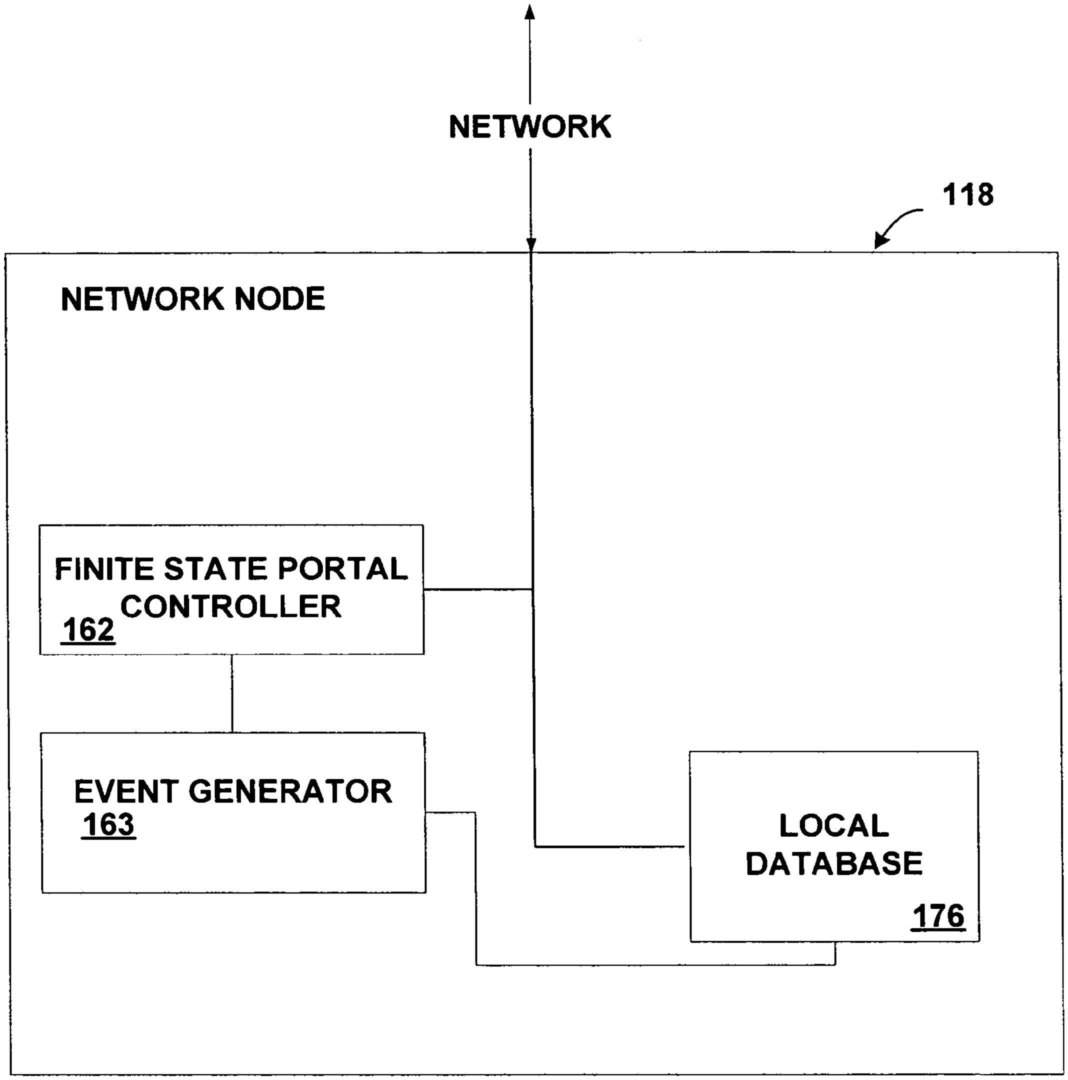
FIG. 4 is a block diagram of a network node similar to the protocol adaptor, access control device and I/O module of FIG. 2.

Now referring to FIG. 4, an exemplary network node 118 similar to the protocol adaptor 114 and the access control device 122 of FIG. 2, includes a finite state portal controller 162 and a local database 176 coupled to a network. The network node 118 further includes an event generator 163 coupled to the finite state portal controller 162 and the local database 176. In one embodiment, a similar event generator 163' operates in the protocol adaptor 114 of FIG. 2 as described in mere detail in conjunction with FIGS. 5 and 6. In another embodiment, a similar event generator 163" operates in the access control device 122 as described in more detail in conjunction with FIG. 7.

The event generator 163 processes data from external resources and uses predetermined resource information stored in the local database 176 to generate portal events which are subsequently processed by the finite state portal controller 162. Resource information generally includes the resource type (e.g., reader, input, output, and temperature), the location of the resource, the association with a portal, and the usage of the resource. For example, an input can be used as a REX, a DSM or an alarm input. In one embodiment, the resource information is stored in at least one table in the database 146 and downloaded as an XML message to the network node 118 local database 176. The local database 176 facilitates the mapping of a signal having one of a plurality of states from a physical device or module location into a portal event. An input resource can have one of four states, for example: NORMAL, ALARM, OPEN, SHORT, corresponding to voltages measured on the signal line. It will be appreciated by those of ordinary skill in the art that a signal can have fewer or more than four states. The local database 176 may also include access card information to provide portal events in conjunction with access reader identification signals. The reader identification signals include but are not limited to Wiegand card data, smart card data, keypad data and biometric data (e.g. fingerprints and facial images).

In one embodiment the local database 176 includes arrays in local storage which map signal and associated states into portal events including a local portal identifier. The local database 176 further includes a mapping from local portal identifier to global portal identifiers to provide generation of global events by the finite state portal controller 162. The local database 176 provides a mapping from a local portal identifier to a physical device or module location to facilitate local actions from the finite state portal controller 162, for example, activating a lock strike to lock or unlock a door.

The network node 118 communicates with the network node controller 154 (FIG. 3) located in the network security controller 110. The network node controller 154 performs queries on database 146 (FIG. 3) to provide configuration data to the local database 176. The predetermined resource information includes configuration information related to each of a plurality of portal objects stored in the database 146.

Figure 5:
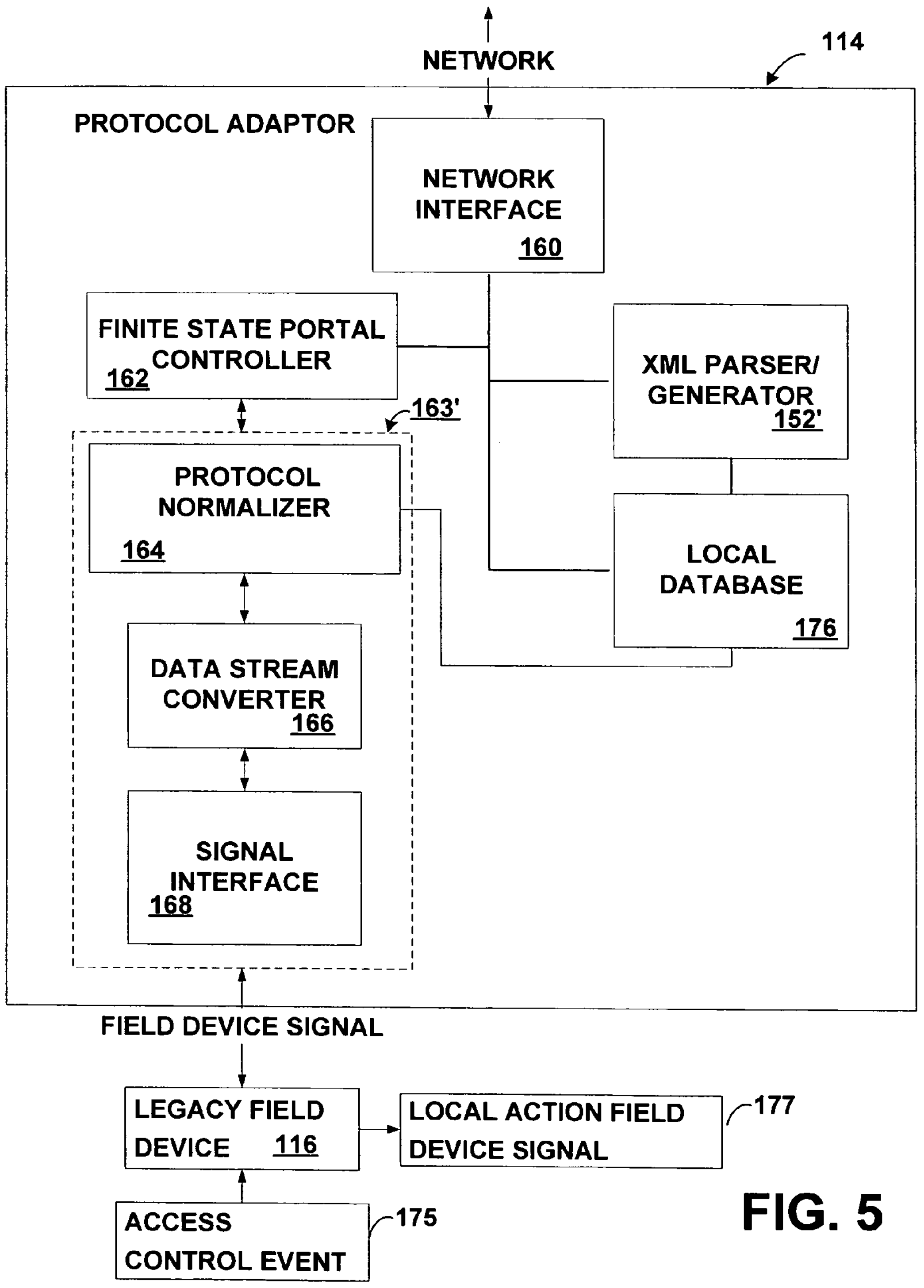
FIG. 5 is a block diagram of the protocol adaptor of FIG. 2.

Now referring to FIG. 5 in which like reference numbers indicate like elements of FIGS. 2 and 4, the exemplary protocol adaptor 114 includes a network interface 160 coupled to an XML parser/generator 152' (similar to the XML parser/generator 152 of FIG. 3), the finite state portal controller 162, the local database 176, and an event generator 163' (similar to the event generator 163 of FIG. 4). The event generator 163' includes a protocol normalizer 164 coupled to the finite state portal controller 162 and the local database 176, a data stream converter 166 which is coupled to the protocol normalizer 164 and to a signal interface 168 adapted to receive data signals from at least one legacy field device 116.

In one embodiment, the signal interface 168 is an RS-485 interface. It will be appreciated by those of ordinary skill in the art that an alternative serial interface, for example, RS-232, RS-422 or network interface can be substituted for the RS-485 interface. The RS-485 interface is coupled to the legacy field device 116. The operation of the protocol adaptor 114 is described further in conjunction with FIG. 6. The signal interface 168, in one embodiment, is a asynchronous receiver transmitter (UART) using an RS-485 multi-drop protocol, communicates with a plurality of legacy field devices 116, each legacy field device **116*a*-116*j* having a unique address. The data stream converter 166 processes an access control event 175 from the legacy field devices 116, calculates and checks the CRC for some legacy field devices 116. Some legacy field devices 116 require a polling sequence which is generated by the data stream converter 166. A local action is processed by the data stream converter 166 resulting in a local action field device signal 177 being transmitted to the legacy field device 116**.

The protocol normalizer 164 processes the converted data stream using a mapping function in conjunction with the local database 176. The mapping function processes state changes and detects state changes. The state changes are transformed into portal events which are subsequently processed by the finite state portal controller 162. The legacy field device 116 can be one of modules 130-133-(FIG. 2) or a panel coupled to at least one of modules 130-133. If the legacy field device 116 is a panel, data from the local database 176 is downloaded into the panel. Although the panel directly controls the portals coupled to the panel, the control of the devices is replicated in the finite state portal controller 162 thereby providing a normalized view of the portal objects including current state information to the network security controller 110. Here, the finite state portal controller 162 does not execute actions which control hardware such as door locks because the legacy field devices 116 (i.e. a panel) is actually controlling the door lock. In one embodiment, including panels as legacy field devices 116, some control over portal is delegated to the panel, but the state of the portal and associated resources is replicated by the finite state portal controller 162 in the protocol adaptor 114.

Figure 6:
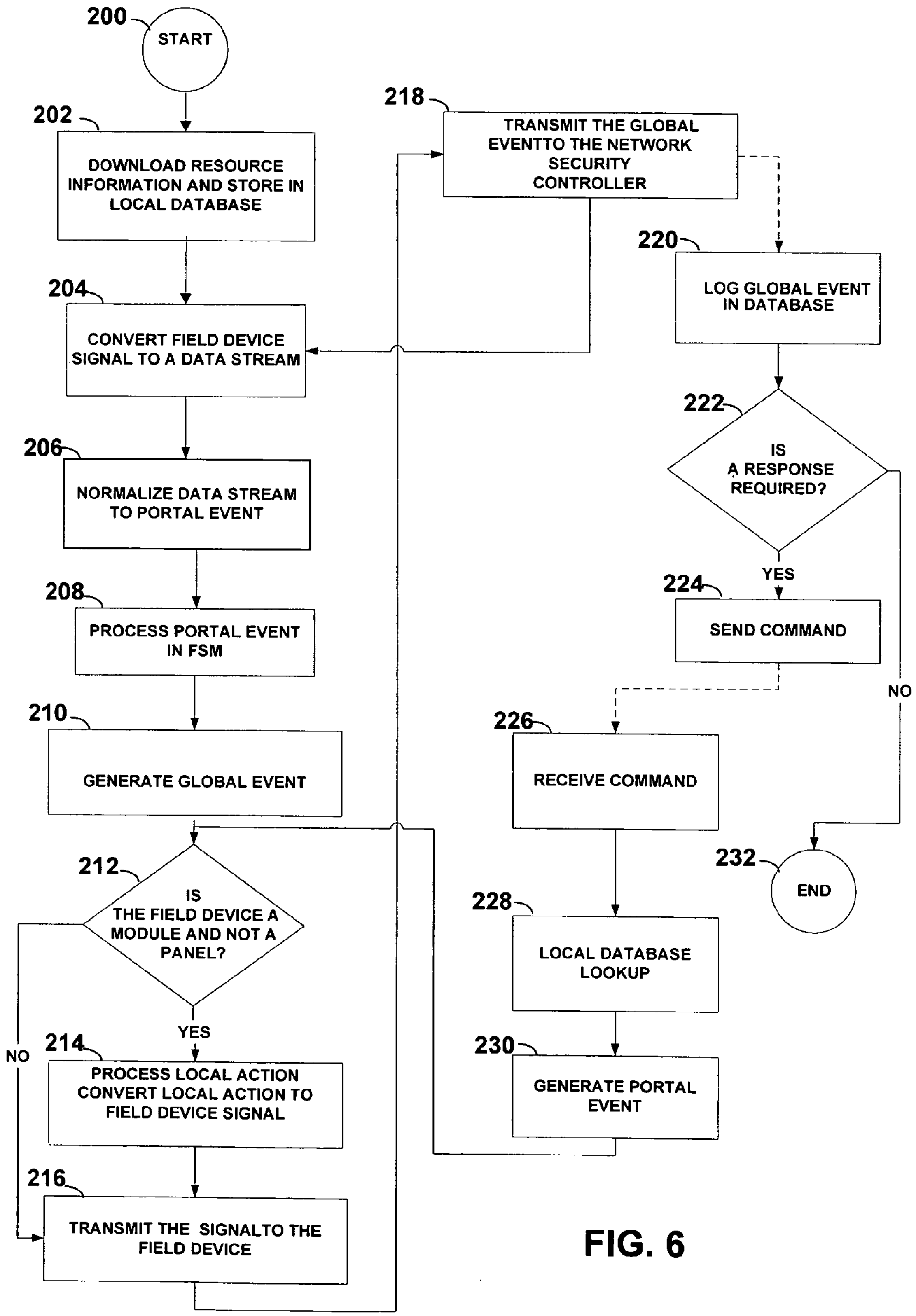
FIG. 6 is a flow diagram illustrating the steps to normalize the data stream from a legacy field device received by the protocol adaptor of FIG. 4.

Turning now to FIG. 6 in which like reference numbers refer to like elements of FIGS. 2, 3, and 5, a flow diagram illustrates a process for normalizing access control events received by the protocol adaptor 114 of FIG. 5. Protocol normalization is a process by which legacy field devices 116 are made accessible to the integrated security system 100 for one or more of the integrated security applications (e.g. access control). The protocol normalization process maps input data streams and between the protocol adaptor 114 and the legacy field devices 116 into portal events and signals to control legacy field devices 116. The protocol normalization process also maps commands from the network security controller 110 into signals to control legacy field devices 116 resources at a portal. In one embodiment, an extensible markup language (XML) is used for representing the predetermined resource information and global events transmitted between the protocol adaptor 114 and the network security controller 110. In one embodiment, an object-oriented paradigm based on portal and resource tables in a relational database is used by the network security controller 110 to model the field devices, access portals and access points.

In the flow diagram of FIG. 6 the rectangular elements are herein denoted "processing blocks" (typified by element 202 in FIG. 6) and represent computer software instructions or groups of instructions. The diamond shaped elements in the flow diagrams are herein denoted "decision blocks" (typified by element 212 in FIG. 6) and represent computer software instructions or groups of instructions which affect the operation of the processing blocks, Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

The process commences in step 200. In step 202, predetermined resource information is downloaded from the network security controller 110 and stored into the local database 176 of the protocol adaptor 114. In one embodiment, the predetermined resource information is configuration data generally derived from a portal table and a resource table in the relational database on the network security controller 110. In this embodiment, the resource information results from SQL queries associating portal objects with portal resources. Here, the relational database is a MySQL™ running on an embedded Linux® operating system. In this embodiment, the configuration data is downloaded over a TCP/IP socket in an extensible markup language representation, for example XML. An XML representation provides portability, efficient upgrades, and flexibility in an enterprise wide system deployment. The TCP/IP sockets are authenticated using hardware tokens including secure hash algorithms and portions of the XML data is encrypted using small message encryption techniques known in the art. In this embodiment the network security controller 110 executes a query including the particular protocol adaptor 114 resources to limit the amount of data downloaded to local database 176. Portal object characteristics, description and XML representation associated with a portal in this embodiment, include:

| Characteristic | Description | XML tag |
|---|---|---|
| Name | Text portal name | NAME |
| ID | ID assigned to the portal | ID |
| Reader resource | Wiegand or magnetic stripe | TYPE |
| REX resource | Input point id for REX point | REX |
| DSM point | Input point id for DSM | DSM |
| Lock point | Output used for lock control | LOCK |

In this embodiment, portal objects are represented in a Portal table in the database 146. The Portal table includes the following fields: ID; reader1ResourceID; reader2ResourceID; dsmResourceID; rexResourceID; lockResourceID; and name.

The resource information is represented in a Resource table in the database 146. The Resource table includes the following fields: ID; NetworkNodeID; Name; Description; Disabled flag; TypeCode; Panel Address; Slot; and Position. It is understood that the portal object and resource information can be represented in one or more tables and in tables with different names and fields. To further uniquely identify a resource on a system with multiple network security controllers 110, each with its own complement of network nodes 118, the network security controller's 110 name is added to the address:

<network security controller>.<node name>.<panel>.<type>.<slot>.<position>.

The network node controller 154 in conjunction with the XML parser/generator 152 generates the following exemplary XML for a two-reader portal connected to a legacy panel having address 2:

<S2NN ID="0FCA56B5" NAME="DownstairsNode">
<PORTAL NAME="Front door" ID="1">
<DSM SHUNT_TIME="12" RELOCK="TRUE">P.2.I.5.1</DSM>
<REX UNLOCK_ON_REX="FALSE">P.2.I.5.2</REX>
<LOCK LOCK_TIME="10">P.2.O.5.1</LOCK>
<READER TYPE="WIEGAND">P.2.R.5.2</READER>
</PORTAL>
</S2NN>

In this example a legacy field device signal (e.g. REX) is mapped to P2.1.5.2. After receiving this XML document, the XML is parsed by XML parser/generator 152' and the predetermined resource information is stored in local database 176, and processing continues in step 204.

In step 204, a field device signal resulting from the access control event 175 is converted to a data stream by the signal interface 168. Depending on the legacy field device 116, a cyclic redundancy check (CRC) or checksum check is performed and the signal is decomposed into structured data by the data stream converter 166. In the above example a legacy field device signal (e.g. REX) is generated at input port 2 on input module 5 which is connected to panel 2 and associated with the portal "Front Door" when the REX input transitions from state NORMAL to ALARM.

In step 206, the structured data is processed into state changes and reader events associated with a portal in the local database. Some legacy field devices 116 report the state of each resource and the data stream converter 166 maintains a state table for each resource in order to detect state changes. For some legacy field devices 116 commands are issued to the legacy field devices 116 to get the status of a resource. Other legacy field devices 116 provide a data stream which is translated into state changes and reader information using lookup tables or similar methods known in the art. In step 206, protocol normalizer 164 normalizes state changes and reader data into to portal events using the predetermined resource information stored in the local database 176. Using the predetermined resource information, the protocol normalizer 164 maps the location of the access control event 175 to determine the associated portal, the type of resource, and whether the resource is coupled to a panel. Finally the protocol normalizer 164 maps the state of the access control event 175, in the case of an input module, into a portal event. If the resource is a reader interface, the protocol normalizer 164 validates the ID card data and maps the result and the data into a portal event. The portal event is queued to the finite state portal controller 162 and processing continues in step 208. In the above example, a legacy field device signal (e.g. REX) is mapped from P2. 1.5.2, state ALARM into the portal event, REX_Activation at the "Front Door," and the portal event is queued to the finite state portal controller 162.

In step 208, the portal event is processed by the finite state portal controller 162, and a state transition may occur as a function of the portal event and the current state of the portal. In one embodiment, portal events associated with REX and DSM signals include: Door Open; Door Closed; REX Activation; and REX Deactivation. Portal events associated with readers include: Invalid Card Read; and "Valid Card Read." Examples of Portal States in conjunction with the finite state portal controller 162 include: Portal Ready; Door Forced; and Door Held.

In step 210, depending on the state transition a global event may be generated. Global events are generated, for example, when a door is forced open. In one embodiment the global events are queued in a circular log buffer on the protocol adaptor 114.

In step 212, it is determined whether the field device is a module (and not a panel). If it is determined than the field device is a module any local actions generated by the state transition in the finite state portal controller 162 at step 208, are processed in step 214, otherwise processing continues in step 216. In the above example, since the legacy field device signal is mapped to a panel P2 no local action is process because the panel takes the appropriate action, here, to unlock the portal door in response to the REX signal.

In step 214, the local action, for example, an action to unlock a door, is processed in response to the portal event. Examples of local actions initiated by the finite state portal controller 162 include: Activate_Portal_Relay; Log_Activate_Portal_Relay; Door_Held_Actions; report_REX_open; and Relock_Portal. The door open action is subsequently converted to a local action field device signal 177 using the predetermined resource information and transmitted to the field device 116 by the data stream converter 166 and the signal interface 168, in step 216.

In step 218, the global event is transmitted to the network security controller 110. Global events include data log information flowing from the protocol adaptor 114 to the network security controller 110. In one embodiment, global event log messages are represented in XML having the general form:

<LOG TYPE="nn" TIME="ttttt"> . . . log contents . . . <LOG> where "nn" is the log type number; and

"ttttt" is the clock time expressed elapsed since Jan. 1, 1970.

The protocol adaptor 114 encodes the data log into XML, maintaining a loose coupling between the protocol adaptor 114 and the associated network security controller 110. Thus, the network security controller 110 can operate without concern for a particular version of the protocol adaptor 114 firmware. The global event packets are received, parsed by the XML parser/generator 152, and logged by the logger 150 (FIG. 3). Examples of global events and the corresponding XML are listed below:

| Type | Description | Parameter(s) | Example |
|---|---|---|---|
| 1 | Valid access completed | Access card number | <LOG TYPE="1" TIME="1234" ><br><CARDNO>12345</CARDNO> |
| | | Portal ID | <PORTAL>1</PORTAL> |
| | | Reader ID | <READER>2</READER><br></LOG> |
| 2 | Invalid access attempt | Access card number | <LOG TYPE="2" TIME="1234" ><br><CARDNO>12345</CARDNO> |
| | | Portal ID | <PORTAL>1</PORTAL> |
| | | Reader ID | <READER>2</READER> |
| | | Reason code | <REASON>1</REASON><br></LOG> |
| 3 | Door held open | Portal ID | <LOG TYPE="3" TIME="1234" ><br><PORTAL>1</PORTAL><br></LOG> |
| 4 | Door forced open | Portal ID | <LOG TYPE="4" TIME="1234" ><br><PORTAL>1</PORTAL><br></LOG> |

On the protocol adaptor 114 processing resumes in step 204, where additional access control events are processed. On the network security controller 110 processing continues in step 220.

Steps 220, 222 and 224 occur on the network security controller 110. In step 220, the global event is logged in the database 146 and the alarm manager 156 processes the global event if necessary. In step 222 it is determined whether a response to a global event is required. If a response is required, processing continues in step 224, otherwise processing of this global event terminates in step 232. In step 224, a command is sent to the protocol adaptor 114. The command could be sent in response to a global event or asynchronously sent as a user command from the browser 106.

In step 226 the command is received by the protocol adaptor 114. In step 228, the command is processed by the protocol normalizer 164 using the local database 176 predetermined resource information to determine the portal and resource associated with the command. In step 230, a portal event is generated. In one embodiment, the command is represented in XML and is parsed to provide the portal event. Processing of the portal event from the command continues in step 212.

Figure 7:
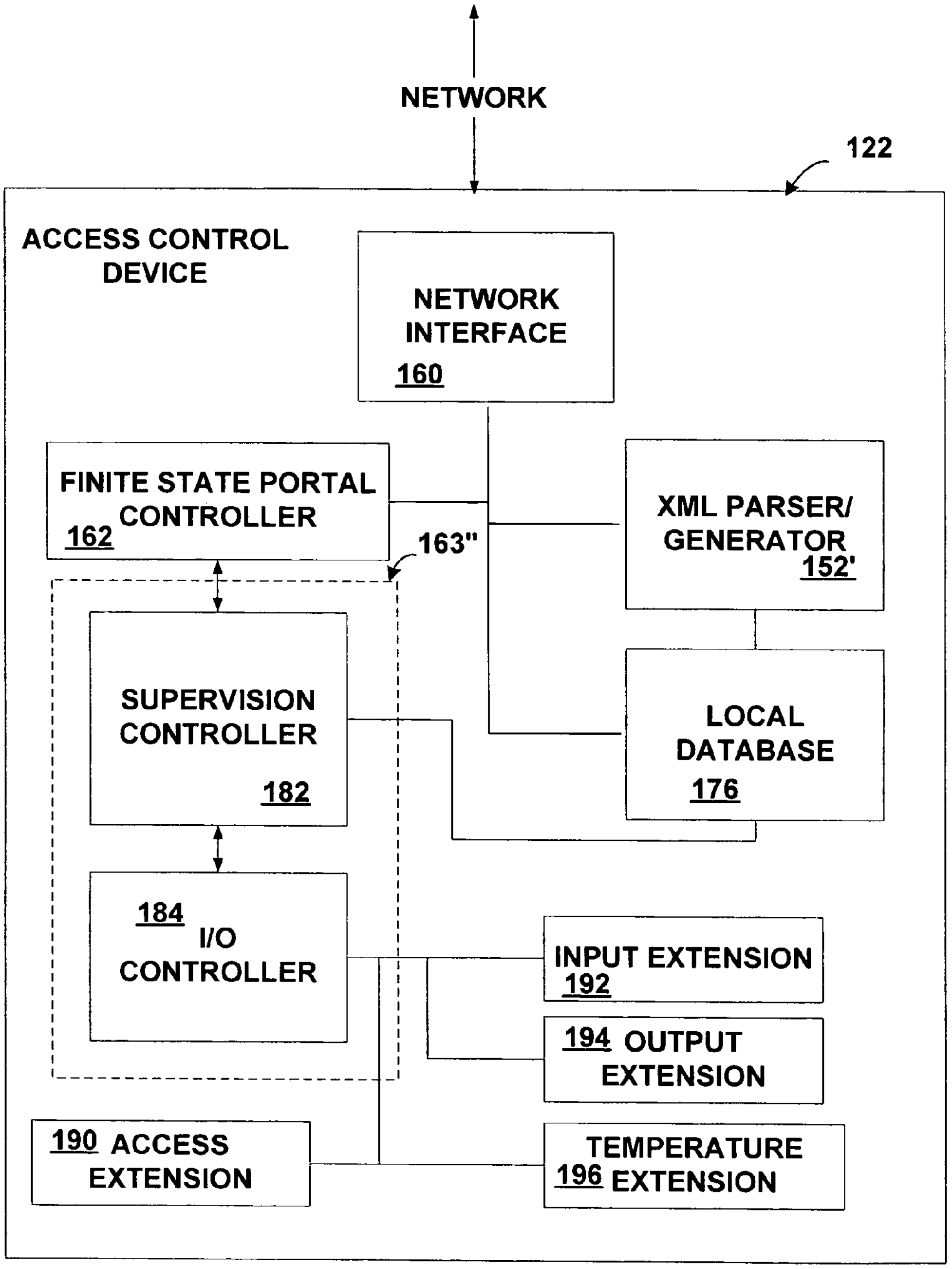
FIG. 7 is a block diagram of the network enabled access control device of FIG. 2.

Now referring to FIG. 7 in which like reference numbers indicate like elements of FIGS. 2 and 4, an exemplary network enabled access control device 122 (also referred to as a network node 118) includes a network interface 180 coupled to the finite state portal controller 162. The finite state portal controller 162 is coupled to the XML parser/generator 152', the local database 176, a supervision controller 182, and an I/O controller 184. The I/O controller 184 is coupled to a combination of access extensions 190 (one extension of each type shown for clarity), input extensions 192, output extensions 194, and temperature extensions 196 (collectively referred to as extensions). The exact combination of extensions depends on a specific portal configuration and system requirements. In one embodiment, the access extensions 124, I/O extension, and temperature extensions operate on an industry standard $1^2$C bus coupled to the access control device 122.

The access control device 122 operates in a manner similar to the protocol adaptor 114 described in FIGS. 5 and 6. The operation is simplified because there are no intermediate panels therefore step 212 is not required. The operation is further simplified because the resources all have a uniform slot and position addressing topology. The supervision controller 182, and the I/O controller 184 form an event generator 163" similar to the event generator 163 (FIG. 4) to generate portal events. The I/O controller 184 provides a polling loop to detect state changes on the extensions, handles reader input from the access extension 190, and communicates with the temperature extension 196 to measure temperature and set temperature alarms. The supervision controller 182 provides the mapping function in conjunction with the local database 176 predetermined resource information, to map access control and temperature events from the extensions 190-196 into portal events. In one embodiment, the local database 176 is the primary source for user, card and configuration information, and is implemented in flash memory which is nonvolatile and is not erased if power to the access control device 122 is interrupted. Alternatively, battery backed SRAM or EEPROM is used for this purpose.

The access extension 190 provides a means of user identification (not shown) coupled to I/O controller 184 including but not limited to a numeric keypad, a keypad with an associated reader and a biometric device, and supports various card and other access control protocols such as a Wiegand communications protocol or a magnetic stripe reader "clock and data" protocol. Biometric access control is provided, for example, by fingerprint or other biometric signature validation. The numeric keypad is used for PIN and other data entry.

An annunciator (not shown) including an alphanumeric display for status and command information provides an indication of when the access extension 190 is idle, and can also display the following data items: date, time, name of the door and user-defined messages. When an access attempt is denied, the display typically displays a message such as "access denied" and optionally also a reason indicator.

Resources coupled to extensions 190-196 perform input and output operations at the hardware level. Resources and corresponding XML type include:

| | |
|---|---|
| Reader | "R"; |
| Supervised input | "I"; |
| Output | "0"; and |
| Temperature sensor | "T." |

A resource coupled to the access control device 122 can be specified in a dot notation in the XML representation as follows: <node name>.<type>.<slot>.<position> where <node name> is the name associated with the access control device 122; <type> is the XML type code associated with the primitive; <slot> is a slot position on the $1^2$C bus of the node in the range {1.7}; and <position> is the position within the application extension.

To further uniquely identify a resource on a system with multiple network security controllers 110, each with its own complement of protocol adaptors 114 and access control devices 122, the network security controllers 110 name is added to the address: <network controller>.<node name>.<type>.<slot>.<position>

For example: MainBranch.FirstFloor.R.5. 1 indicates that the network security controller's 110 name is MainBranch and the security controllers 110 controls the access control device 122 FirstFloor. Extending the example, the access control application extension 190 in slot 5 of the access control device 122, has the following resources:

| Resource | Identifiers |
|---|---|
| Readers | R.5.1 and R.5.2 |
| Inputs | 1.5.1 through R.5.4 |
| Outputs | 0.5.1 through 0.5.4 |

The access extension 190 can also provide a programmable local audible indication of keypad presses. A beep or similar positive acknowledgement of keypad presses is often desirable. The same annunciator may be used to signal door held/forced open or similar alarm conditions. In another embodiment, commands to and from the readers coupled to the access extensions 190 are encrypted to provide additional security. To keep all communication between the access control device 122 and the rest of the system 100 secure, data can be authenticated and encrypted using hardware tokens so that no clear text including commands, ID numbers or biometric data is ever sent on the private LAN 112. Not only does this protect this data, it also makes it difficult to subvert the activity on the LAN 112 by a malicious person. In this embodiment, 128 bit encryption (or higher) secures data transmitted over the company LAN 102 using SSL.

Figure 8:
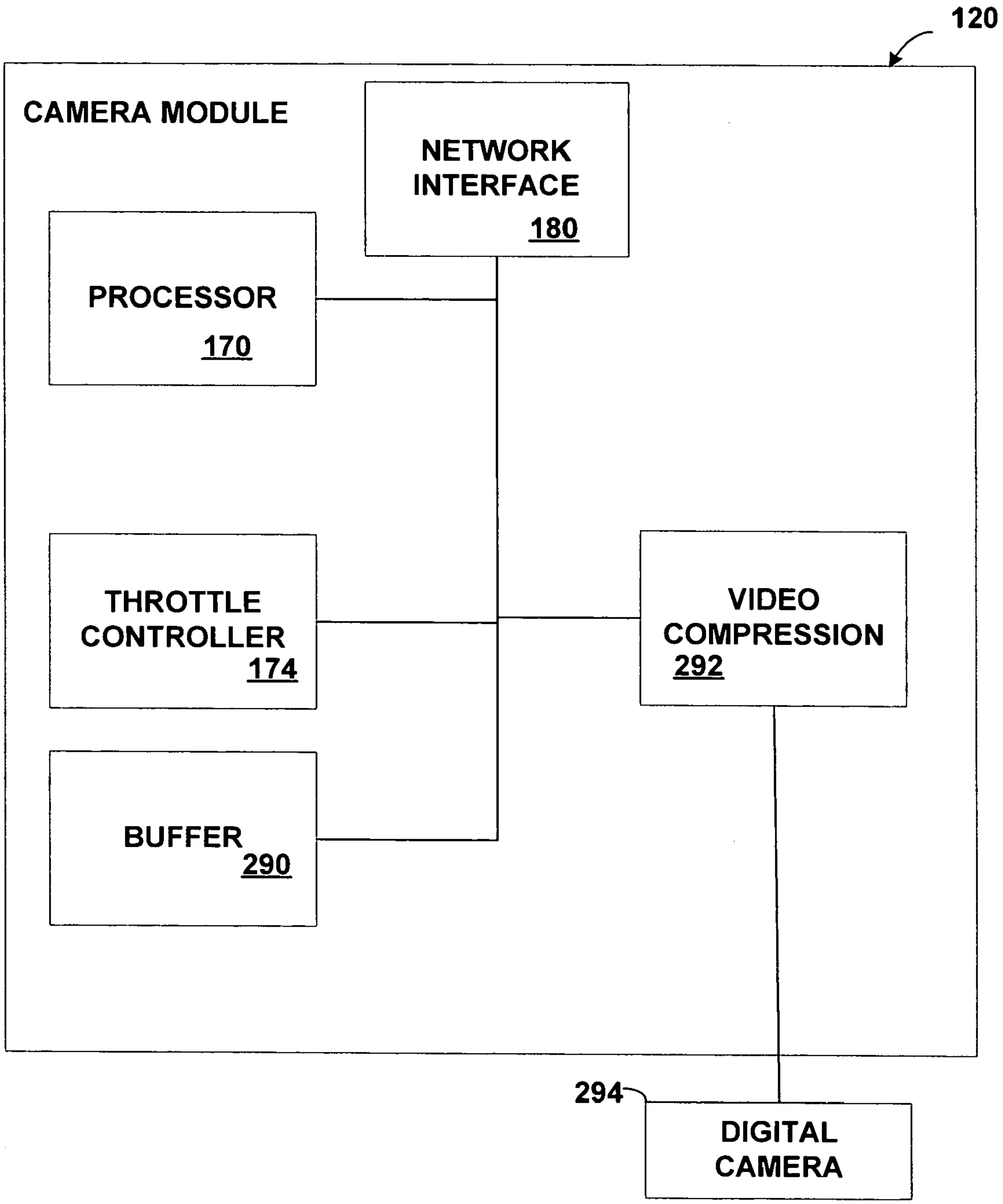
FIG. 8 is a block diagram of the network enabled camera module of FIG. 2.

Now referring to FIG. 8 in which like reference numbers indicate like elements of FIGS. 2 and 7, an exemplary network enabled video camera module 120 includes at least one digital camera 294 (similar to the digital camera 121 of FIG. 2) having a PTZ control (not shown), and a processor 170. The processor 170 is coupled to a throttle controller 174, a video compression engine 292 (also referred to a video compression processor 292, and a local memory storage buffer 290 for storing compressed video data. The video camera module 120 adds video functionality to the system 100 and operates in certain situations under the control of the network security controller 110 and autonomously in other situations. Integrated functions, such as video on alarm and snapshot on access are generally controlled by the network security controller 110.

It will be appreciated by those of ordinary skill in the art that the video camera module 120 and the digital cameras 294 can be combined into a single integrated package, and that the camera module 120 can be connected to more than one digital camera 294. The digital camera 294 includes but is not limited to a CMOS camera, an image sensor, a CCTV camera, and a video camera. The throttle controller 174 is used in conjunction with the throttle controller 136 (FIG. 3) in the network security controller 110 to control the data rate from the video camera module 120 such that the supervision of the access point is not detrimentally affected.

In one embodiment, the video camera module 120 operates in one of four modes: Command mode, when the video camera module 120 responds to commands from the network security controller 110. In preimage mode, the video camera module 120 captures video optimized for memory consumption and stores the video in a circular buffer, overwriting the oldest images with new images. This optimization includes some combination of capture of reduced resolution images, reduced frame rate, or reduced color depth. In preimage mode, the video camera module 120 captures video at a reduced resolution, frame rate, or color depth. Preimage video is typically discarded until an event occurs, at which point the video module enters postimage mode. In postimage mode, the video camera module 120 captures video optimized for detail and use as evidence, writing into the circular image buffer. In postimage mode, the video camera module 120 captures video at an increased resolution and frame rate. In streaming mode, the video camera module 120 passes video to the network security controller 110 as a stream suitable for viewing in real time.

Other optional capabilities of the video camera module 120 include the ability to capture a single frame, capture a video clip for a preset time, number or frames, or until a command to stop capture is received. The video camera module 120 is controlled by the network security controller include to capture a single frame image on an access event in which physical access is granted or denied. When an alarm event occurs, the network security controller 110 directs the video camera module 120 to enter the postimage mode, capturing video for a preset number of frames, time, or until a command to stop is received. Because the camera module 120 is a network enabled device, an alarm event at the network enabled access control device 122 can trigger one of the image modes without the intervention of the network security controller 110. Zones can be set within the video frame to trigger alarms/events on other network enabled devices by detecting motion within predetermined zones, while ignoring motion outside the predetermined zone. In one embodiment, the camera module 120 is a resource of one or more portals in the camera 294 field of view. A motion detected alarm is sent as an XML document to the supervision controller 182, parsed by XML parser/generator 152 and mapped into portal events, for example, Video_Motion_Activation, for the affected portals.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. An integrated security system operating over a network comprising:

a network security controller coupled to the network comprising:

a relational database including portal objects and related resources represented in at least one table in the relational database; at least one network node comprising:

a local database coupled to the network adapted to receive predetermined resource information from the relational database;

an event generator coupled to the local database to provide at least one portal event in response to the predetermined resource information received by the local database, the event generator further comprises a protocol normalizer and a data stream converter coupled to the protocol normalizer and adapted to receive data from a field device; and a finite state portal controller coupled to the network and the event generator for providing at least one of an action and a global event in response to the at least one portal event.

2. The system of claim 1 wherein the field device is at least one of:

a reader module;

an input module;

an output module;

a communications module and a panel.

3. The system of claim 1 wherein the event generator comprises:

a supervision controller;

an I/O controller coupled to the supervision controller and adapted to receive signals from at least one of:

an input extension;

an output extension;

a temperature extension; and an access extension.

4. The system of claim 1 further comprising a network node controller coupled to the database and coupled to the at least one network node.

5. The system of claim 1 wherein the network security controller further comprises an extensible markup language generator and the at least one network node local database downloads an extensible markup language representation of the predetermined resource information.

6. The system of claim 5 wherein the extensible markup language representation comprises XML.

7. The system of claim 1 wherein the at least one global event is represented using an extensible markup language representation.

8. The system of claim 7 wherein the extensible markup language representation comprises XML.

9. The system of claim 1 wherein the network security controller further comprises a web server coupled to the network and the database to provide at least one user interface to the integrated security system in at least one browser.

* * * * *